United States Patent
Kang et al.

(10) Patent No.: US 11,963,022 B2
(45) Date of Patent: Apr. 16, 2024

(54) METHOD AND APPARATUS FOR PROCESSING DETNET TRAFFIC

(71) Applicant: ELECTRONICS AND TELECOMMUNICATIONS RESEARCH INSTITUTE, Daejeon (KR)

(72) Inventors: Yoo Hwa Kang, Daejeon (KR); Namseok Ko, Daejeon (KR); Changki Kim, Daejeon (KR); Jeong-Dong Ryoo, Daejeon (KR); Yeoncheol Ryoo, Daejeon (KR); Taesik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/075,506

(22) Filed: Dec. 6, 2022

(65) Prior Publication Data

US 2023/0209371 A1    Jun. 29, 2023

(30) Foreign Application Priority Data

| Dec. 6, 2021 | (KR) | ......................... 10-2021-0172903 |
| Feb. 28, 2022 | (KR) | ......................... 10-2022-0026316 |
| Jul. 4, 2022 | (KR) | ......................... 10-2022-0081912 |
| Dec. 6, 2022 | (KR) | ......................... 10-2022-0169026 |

(51) Int. Cl.
*G06F 15/16* (2006.01)
*H04L 41/0823* (2022.01)
*H04W 24/02* (2009.01)

(52) U.S. Cl.
CPC ......... *H04W 24/02* (2013.01); *H04L 41/0823* (2013.01)

(58) Field of Classification Search
CPC ........................... H04L 41/0823; H04W 24/02
USPC ......................................................... 709/220
See application file for complete search history.

(56) References Cited

U.S. PATENT DOCUMENTS

| 10,225,789 | B2 * | 3/2019 | Thubert | ................. | H04W 24/02 |
| 10,433,191 | B2 * | 10/2019 | Thubert | ................. | H04W 72/12 |
| 10,524,194 | B2 * | 12/2019 | Thubert | ................. | H04W 24/02 |
| 10,524,267 | B2 * | 12/2019 | Henry | ................... | H04W 72/54 |
| 10,638,287 | B2 * | 4/2020 | Thubert | ................. | H04W 48/18 |
| 10,979,350 | B1 * | 4/2021 | Nainar | .................... | H04L 45/44 |
| 11,202,222 | B2 * | 12/2021 | Joseph | ................... | H04W 24/02 |
| 11,405,299 | B2 * | 8/2022 | Nainar | .................... | H04L 43/12 |
| 11,451,945 | B2 * | 9/2022 | Thubert | .................. | H04W 4/70 |
| 11,470,003 | B2 * | 10/2022 | Bastug | .................... | H04L 47/10 |

(Continued)

OTHER PUBLICATIONS

3rd Generation Partnership Project; Technical Specification Group Services and System Aspects; System architecture for the 5G System (5GS); Stage 2 (Release 17), 3GPP TS 23.501 V17.2.0 (Sep. 2021).

*Primary Examiner* — Moustafa M Meky
(74) *Attorney, Agent, or Firm* — LRK PATENT LAW FIRM

(57) ABSTRACT

A method and apparatus for processing DetNet traffic through the steps of receiving configuration information for configuring a DetNet node from a DetNet controller of a DetNet system and configuring a UPF, a DS-TT, and/or a NW-TT in a mobile communication system as the DetNet node are provided.

15 Claims, 12 Drawing Sheets

(56) References Cited

U.S. PATENT DOCUMENTS

| | | | |
|---|---|---|---|
| 11,575,599 B2* | 2/2023 | Bastug | H04L 45/04 |
| 11,716,274 B2* | 8/2023 | Nainar | H04L 43/50 |
| | | | 370/241.1 |
| 11,770,722 B2* | 9/2023 | Kolding | H04L 47/2491 |
| | | | 370/235 |
| 2019/0215704 A1* | 7/2019 | Thubert | H04W 24/02 |
| 2019/0215838 A1* | 7/2019 | Henry | H04W 72/52 |
| 2020/0382432 A1 | 12/2020 | Thubert et al. | |
| 2020/0404697 A1 | 12/2020 | Yang et al. | |
| 2021/0250787 A1* | 8/2021 | Kolding | H04L 47/283 |
| 2021/0329580 A1 | 10/2021 | Kim et al. | |
| 2021/0385148 A1* | 12/2021 | Nainar | H04L 43/20 |
| 2022/0150159 A1* | 5/2022 | Medagliani | H04L 47/83 |
| 2022/0272035 A1* | 8/2022 | Bastug | H04L 43/0858 |
| 2022/0272040 A1* | 8/2022 | Bastug | H04L 47/82 |
| 2022/0353165 A1* | 11/2022 | Nainar | H04L 43/50 |
| 2023/0127464 A1* | 4/2023 | Xiong | H04L 12/4633 |
| | | | 709/238 |
| 2023/0156523 A1* | 5/2023 | Xiong | H04L 45/38 |
| | | | 370/329 |
| 2023/0164071 A1* | 5/2023 | Bastug | H04L 45/04 |
| | | | 370/252 |
| 2023/0171575 A1* | 6/2023 | Thubert | H04W 48/18 |
| | | | 370/255 |

* cited by examiner

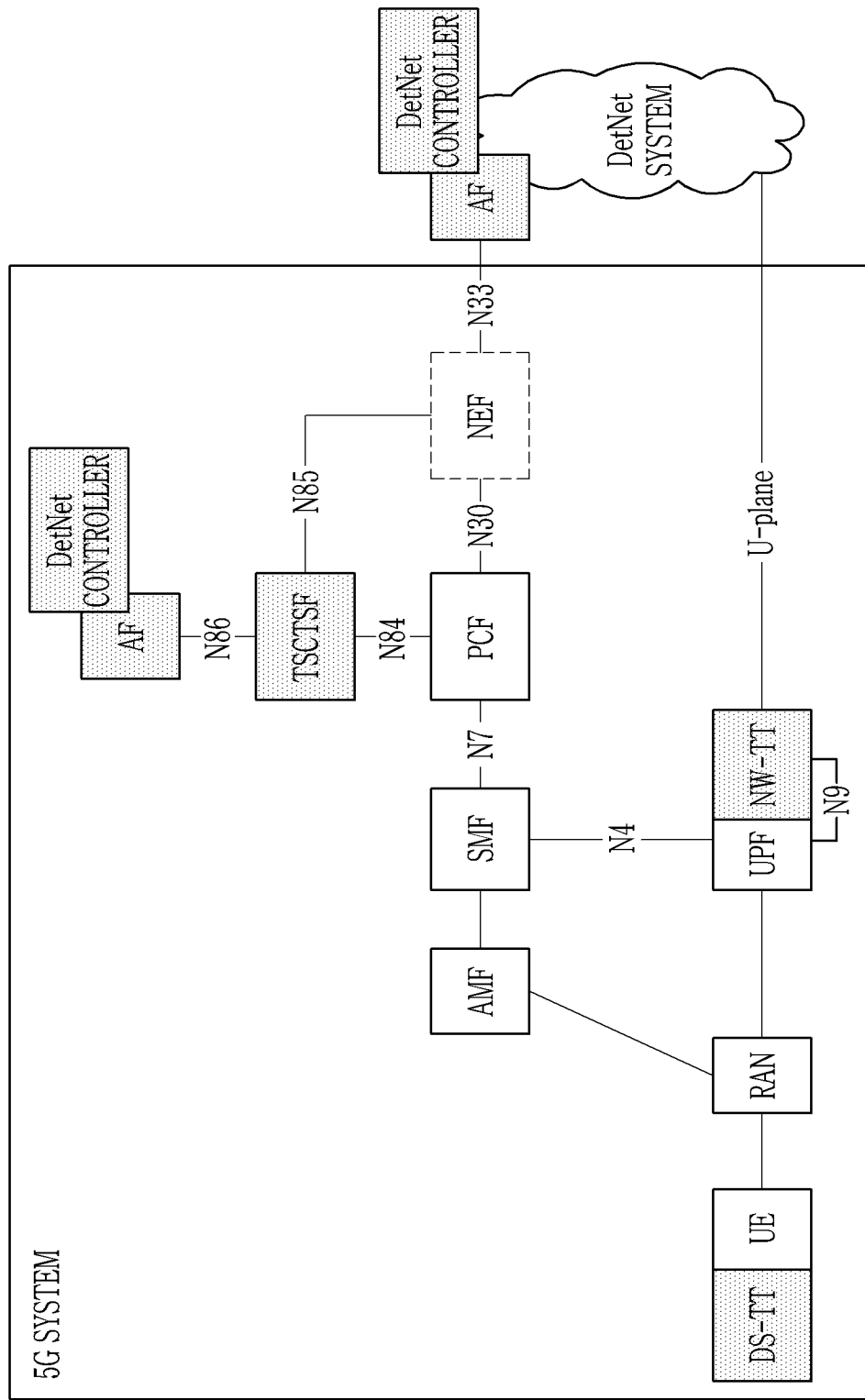

FIG. 9

```
"traffic-profile": [
    {
        "name": "pf-1",
        "traffic-requirements": {
            "min-bandwidth": "100000000",
            "max-latency": 100000000",
            "max-latency-variation": 200000000,
            "max-loss": 2,
            "max-consecutive-loss-tolerance": 5,
            "max-misordering": 0
        },
        "traffic-spec": {
            "interval": 5,
            "max-pkts-per-interval": 10,
            "max-payload-size": 1500,
            "max-payload-size": 100,
            "max-pkts-per-interval": 1
        },
        "member-apps": [
            "app-0",
            "app-1"
        ]
    }
```

METHOD AND APPARATUS FOR PROCESSING DETNET TRAFFIC

CROSS-REFERENCE TO RELATED APPLICATIONS

This application claims priority to and the benefit of Korean Patent Application No. 10-2021-0172903 filed in the Korean Intellectual Property Office on Dec. 6, 2021, Korean Patent Application No. 10-2022-0026316 filed in the Korean Intellectual Property Office on Feb. 28, 2022, Korean Patent Application No. 10-2022-0081912 filed in the Korean Intellectual Property Office on Jul. 4, 2022, and Korean Patent Application No. 10-2022-0169026 filed in the Korean Intellectual Property Office on Dec. 6, 2022, the entire contents of which are incorporated herein by reference.

BACKGROUND

1. Field of the Invention

The present disclosure relates to a method and apparatus for processing DetNet traffic in a mobile communication system.

2. Description of Related Art

As the 5G system increasingly requires high-reliability and low-latency services, the 5G system is integrating with Time Sensitive Networking (TSN) system. By acting as a bridge in the TSN network, the 5G system processes TSN streams.

SUMMARY

Embodiments of the invention provide an application function.

Embodiments of the invention provide a TSN translator.

Embodiments of the invention provide a method for processing a DetNet traffic.

According to an embodiment, an application function is provided. The application function includes: a processor and a memory, wherein the processor executes a program stored in the memory to perform: receiving configuration information for configuring a Deterministic Networking (DetNet) node from a DetNet controller in a DetNet system; and configuring a user plane function (UPF), a device side time sensitive networking translator (DS-TT), and/or a network side time sensitive networking (NW-TT) in a mobile communication system as the DetNet node.

In such embodiment, when configuring a UPF, a DS-TT, and/or a NW-TT in a mobile communication system as the DetNet node, the processor may perform adding the configuration information to at least one information container and transferring the at least one information container to the DS-TT and/or the NW-TT.

In such embodiment, the application function may be a DetNet application function (AF) configured to communicate the mobile communication system with the DetNet controller of the DetNet system.

In such embodiment, the application function may be a time sensitive communication time synchronization function (TSCTSF) in the mobile communication system.

In such embodiment, the application function may be a time sensitive networking (TSN) application function (AF) in the mobile communication system.

In such embodiment, when receiving configuration information for configuring a DetNet node from a DetNet controller in a DetNet system, the processor may perform receiving the configuration information from the DetNet controller located in an external domain of the mobile communication system via a network exposure function (NEF) in the mobile communication system.

In such embodiment, when receiving configuration information for configuring a DetNet node from the DetNet controller in a DetNet system, the processor may perform receiving the configuration information from the DetNet controller located within a domain of an operator of the mobile communication system.

In such embodiment, the processor may execute the program to further perform: receiving DetNet traffic information from the DetNet controller; and mapping a DetNet flow to a quality of service (QoS) flow of the mobile communication system based on the DetNet traffic information.

In such embodiment, the processor may execute the program to further perform sending a parameter for managing connectivity of the DetNet flow to the DS-TT and/or the NW-TT.

According to an embodiment, a time sensitive networking (TSN) translator is provided. The TSN translator includes: a processor and a memory, wherein the processor executes a program stored in the memory to perform: receiving configuration information for configuring a Deterministic Networking (DetNet) node from a DetNet controller of a DetNet system through an application function (AF) of a mobile communication system; and processing a DetNet flow of the DetNet system based on the configuration information.

In such embodiment, the TSN translator may be a device-side TSN translator (DS-TT) located in the device side or a network-side TSN translator (NW-TT) located in a user plane function (UPF) in the mobile communication system.

In such embodiment, the processor may execute the program to further perform: receiving a parameter for managing connectivity of the DetNet flow from the application function; and managing the connectivity of the DetNet flow based on the parameter.

In such embodiment, the processor may execute the program to further perform reporting, by the DS-TT, status information of the DetNet flow to the application function through NAS signaling when the TSN translator is the DS-TT.

In such embodiment, the processor may execute the program to perform reporting, by the NW-TT, status information of the DetNet flow to the application function through the UPF when the TSN translator is the NW-TT.

According to an embodiment, a method for processing a DetNet traffic is provided. The method includes: receiving, by an application function, configuration information for configuring a DetNet node from a DetNet controller in a DetNet system; and configuring, by the application function, a user plane function (user plane function, UPF), a device side time sensitive networking translator (DS-TT), and/or a network side time sensitive networking translator (NW-TT) in a mobile communication system as the DetNet node.

In such embodiment, the configuring a UPF, a DS-TT, and/or a NW-TT in a mobile communication system as the DetNet node may include adding the configuration information to at least one information container and transferring the at least one information container to the DS-TT and/or the NW-TT.

In such embodiment, the application function may be a time sensitive communication time synchronization function (TSCTSF) in the mobile communication system.

In such embodiment, the receiving configuration information for configuring a DetNet node from a DetNet controller of a DetNet system may include receiving, by the application function, the configuration information from the DetNet controller located in an external domain of the mobile communication system via a network exposure function (NEF) within the mobile communication system; or receiving, by the application function, the configuration information from the DetNet controller located in a domain of an operator of the mobile communication system.

In such embodiment, the method may further include: receiving DetNet traffic information from the DetNet controller; and mapping a DetNet flow to a quality of service (QoS) flow of the mobile communication system based on the DetNet traffic information.

In such embodiment, the method may further include transferring a parameter for managing connectivity of a DetNet flow to the DS-TT and/or the NW-TT.

BRIEF DESCRIPTION OF THE DRAWINGS

FIG. 6 is a diagram illustrating a mobile communication system and a DetNet system including a TSCTSF performing the function of the DetNet AF according to an embodiment.

FIG. 9 is a diagram illustrating information of a DetNet flow identified in a port of a mobile communication system according to an embodiment.

DETAILED DESCRIPTION OF THE EMBODIMENTS

Figure 1:
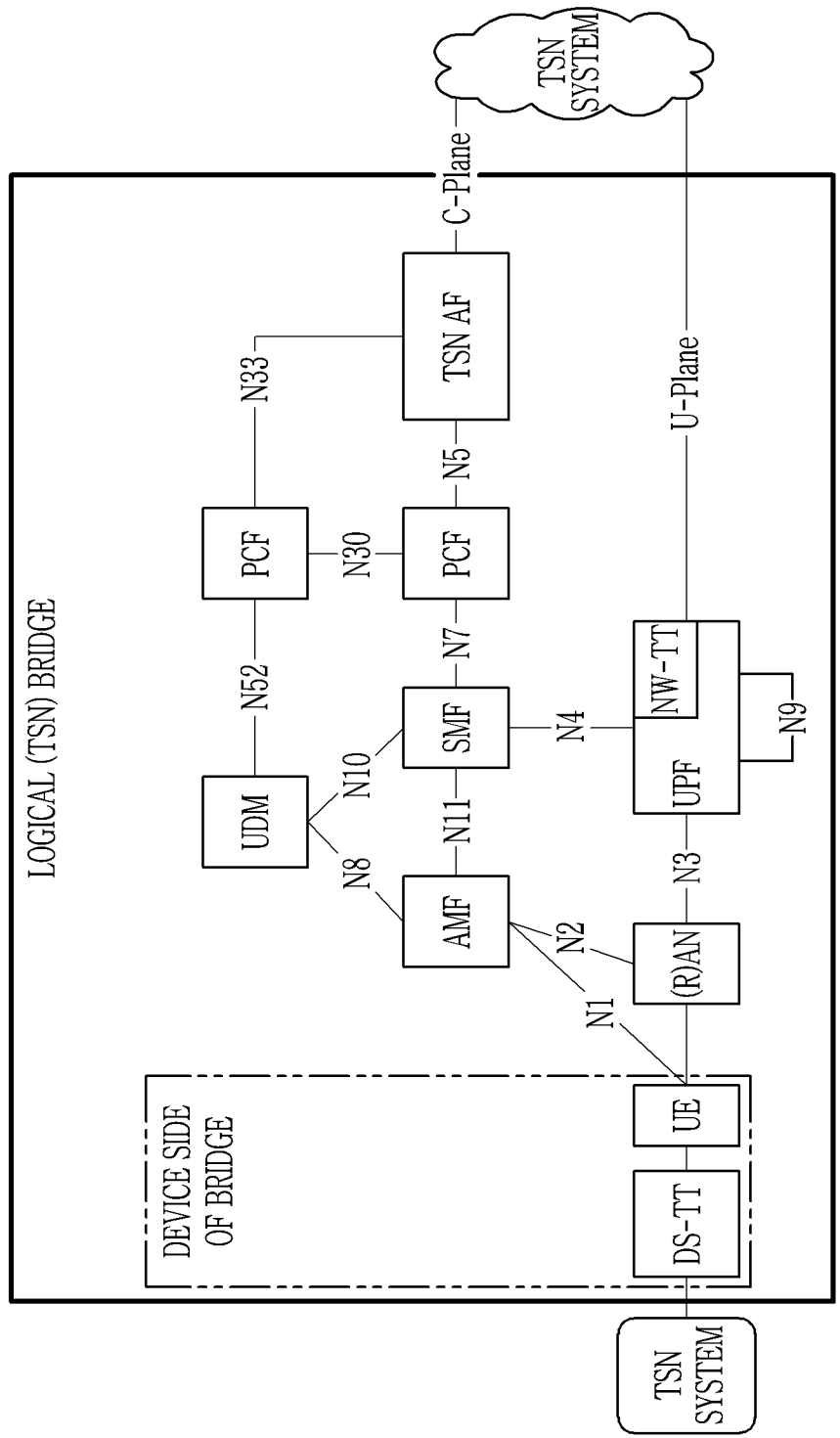
FIG. 1 is a diagram illustrating a 5G system operating as a TSN bridge according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein.

Further, in order to clearly describe the description in the drawing, parts not related to the description are omitted, and similar reference numerals are attached to similar parts throughout the specification.

Throughout the specification, a terminal may be called user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a diagram illustrating a 5G system operating as a TSN bridge according to an embodiment.

Referring to FIG. 1, a 5G system (5GS) may operate as a single logical TSN bridge to combine a mobile communication network and a TSN.

To combine with TSN, a TSN application function (TSN AF) may be added in a control plane of the 5G system, and a device side TSN translator (DS-TT) and a network side TSN translator (NW-TT) may be added to user equipment (UE) and a user plane function (UPF) of a user plane of the 5G system, respectively.

The TSN AF may connect Centralized Network Configuration (CNC) of the TSN and the 5G system and receive TSN stream information and TSN bridge configuration information from the CNC.

In addition, the TSN AF may configure TSN bridge information into Port Management Information Container (PMIC) and Bridge Management Information Container (BMIC), and then the DS-TT and the NW-TT may set up ports and bridges based on the PMIC and the BMIC. As such, the 5G system may operate as a bridge in the TSN network and process TSN streams.

Figure 2:
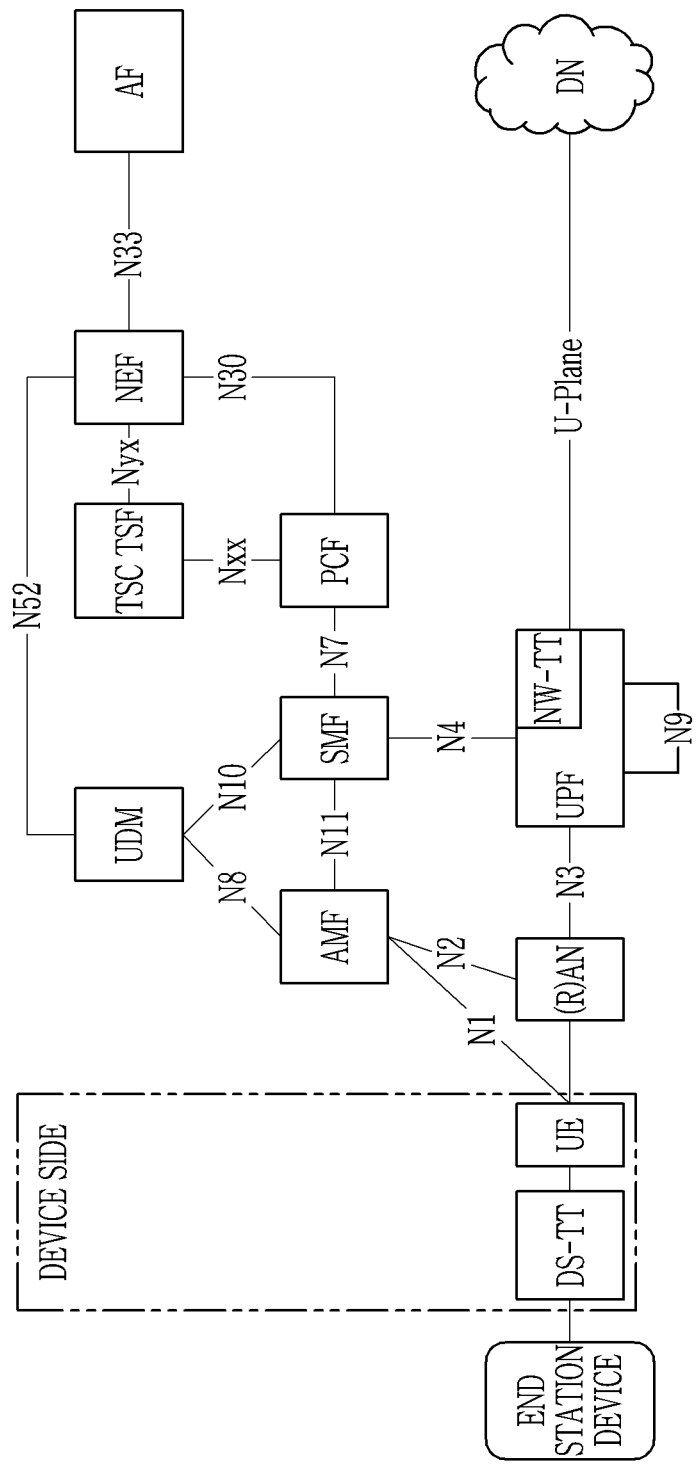
FIG. 2 is a diagram illustrating a mobile communication system capable of providing time-sensitive communication and time synchronization service according to an embodiment.

FIG. 2 is a diagram illustrating a mobile communication system capable of providing time-sensitive communication and time synchronization service according to an embodiment.

As demands for time-sensitive communication (TSC) service based on time synchronization in application services such as video, audio, and image provision increases, the core network of the mobile communication system may include a time sensitive communication time synchronization function (TSCTSF).

Referring to FIG. 2, the TSCTSF may interface with a policy control function (PCF) and provide the time-sensitive communication and time synchronization services to an AF outside the network of mobile operators through a Network Exposure Function (NEF). When the AF is inside the mobile operator's network, the TSCTSF may connect to the AF without the NEF. To provide the TSC service in the TSN, an Ethernet packet data unit (PDU) session (Session) may be used. Alternatively, an Internet protocol (IP) PDU session may be used so that the TSC service is used as an application service. In addition, since the mobile communication system can support IEEE 1588 in addition to IEEE 802.1AS time synchronization operating in the TSN network, the TSCTSF in the core network may provide a deterministic QoS-based time-sensitive communication and time synchronization service required by the application services.

Figure 3:
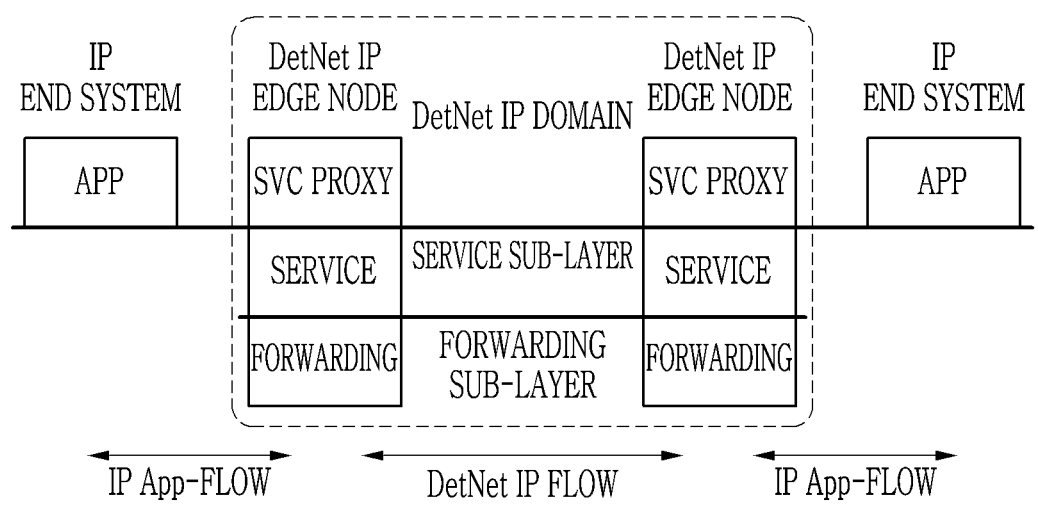
FIG. 3 is a diagram illustrating an IP domain of a DetNet according to an embodiment.

FIG. 3 is a diagram illustrating an IP domain of a DetNet according to an embodiment.

As the range of the time-sensitive communication service provided by the 5G system gradually expands from the TSN to the application services, supports for deterministic networking (DetNet) services, a wide-area deterministic networking technology, may be required to overcome the limitations of a short-range DetNet of the TSN.

The DetNet technology in IETF is a network layer (that is, L3 layer) technique that guarantees lossless delivery of deterministic flows and maximum end-to-end latency through explicit route, resource reservation, and service protection and exists within a single control.

FIG. 3 shows a stream of the DetNet flow operating in a DetNet IP domain. The service sub-layer may classify deterministic flows and provide service protection functions such as lossless delivery and rearrangement by using a sequence number of the flow. The forwarding sub-layer may provide resource reservation and explicit routing for deterministic flows, which is the basis of wide-area deterministic networking technology. In FIG. 3, when a App flow is an IP packet, the App flow may include at least one of a source IP address, a destination IP address, an IPv6 flow label, a differentiated service code point (DSCP), a protocol, a source port, and destination port.

Figure 4:
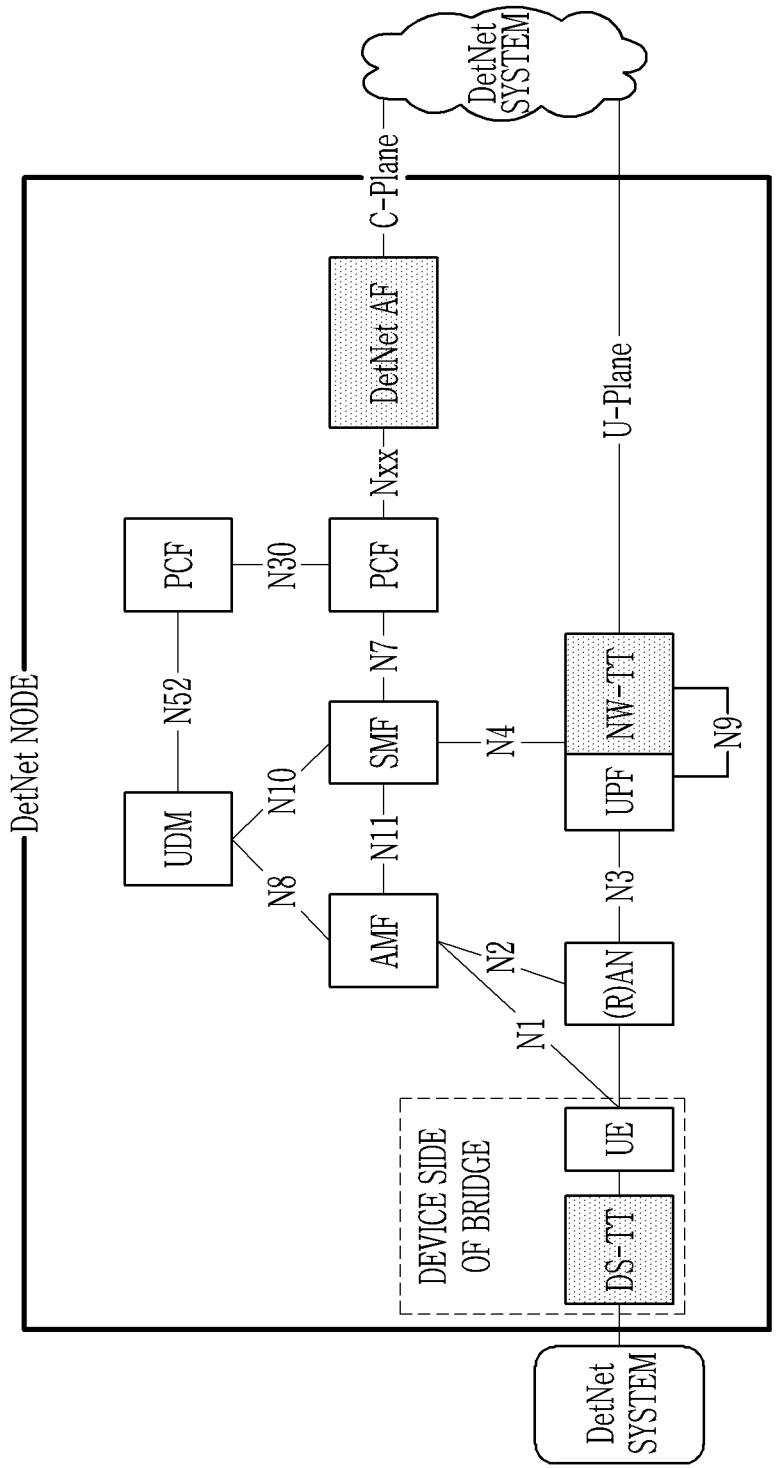
FIG. 4 is a diagram illustrating a mobile communication system operating as the DetNet node according to an embodiment.

FIG. 4 is a diagram illustrating a mobile communication system operating as the DetNet node according to an embodiment.

Referring to FIG. 4, a 5G system with SBA (Service Based Architecture) may operate as a single DetNet node. According to an embodiment, the DetNet AF may be included in the control plane of the mobile communication system, and the DetNet AF may be connected to the PCF inside the 5G system and connected to a DetNet controller outside the 5G system.

In an embodiment, the DetNet AF may be connected to the DetNet controller (e.g., a centralized DetNet controller) and may transmit and receive DetNet Yang (Yet Another Next Generation) configuration information, including DetNet traffic profile and flow specification, to and from the DetNet controller.

In order to process the DetNet traffic in the 5G system, the DetNet AF may map DetNet traffic information to QoS information of the 5G system and generate related time-sensitive communication assistance information (TSCAI). A QoS profile and the TSCAI of the 5G system generated by the DetNet AF may be used in the same way as the provision method of the TSC service of the 5G system.

For example, 5G QoS mapped by the DetNet AF may generated as a policy rule by the PCF and then be provided to the 5G system, and the UPF may process the QoS of corresponding flow according to the provided QoS policy rule. The access network of the 5G system may process corresponding flow according to the QoS profile and the TSCAI information. With this method, the flow for the TSC service may be processed within the 5G system.

Figure 5A:
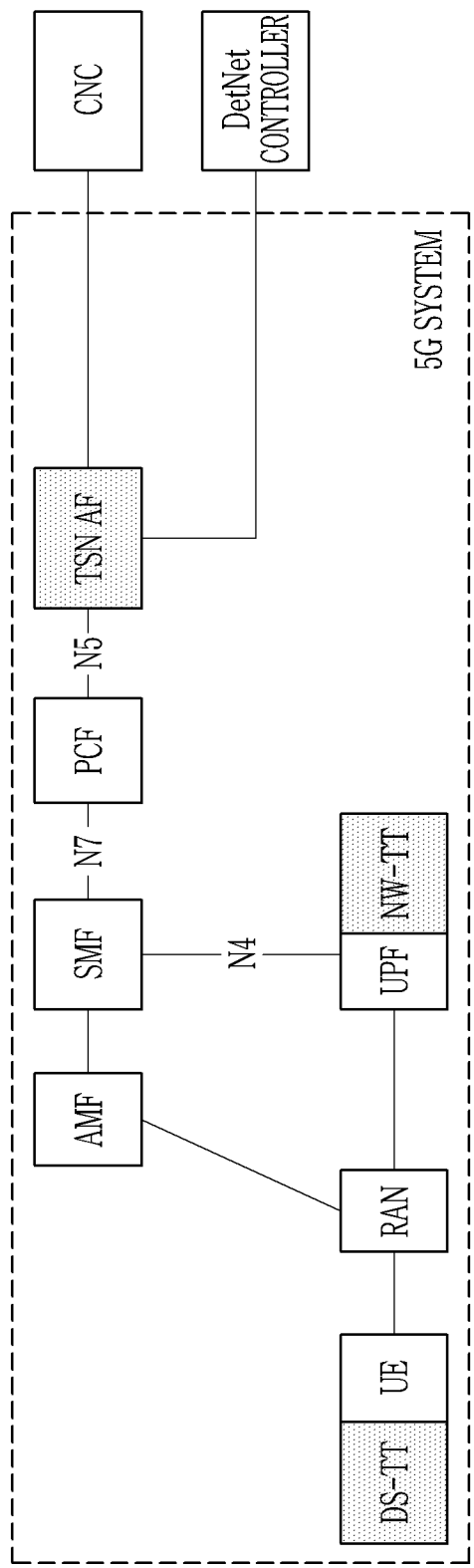
FIG. 5A is a diagram illustrating a mobile communication system including a TSN AF that performs a function of the DetNet AF according to an embodiment.
Figure 5B:
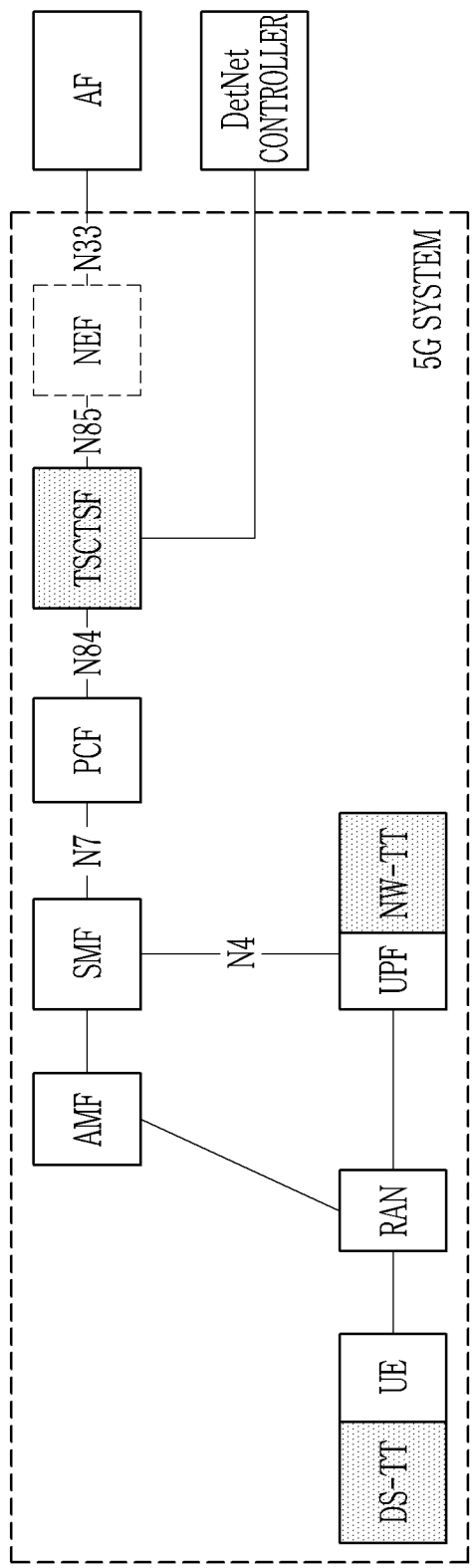
FIG. 5B is a diagram illustrating a mobile communication system including a TSCTSF that performs a function of the DetNet AF according to an embodiment.
Figure 5C:
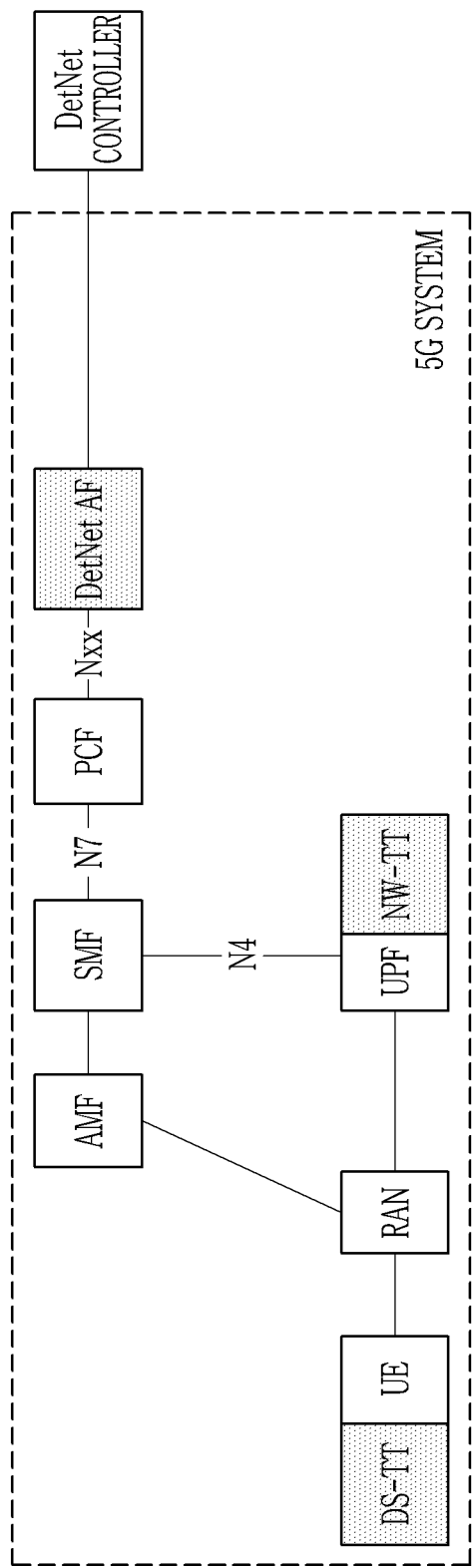
FIG. 5C is a diagram illustrating a mobile communication system including a DetNet AF according to an embodiment.

FIG. 5A is a diagram illustrating a mobile communication system including a TSN AF that performs a function of the DetNet AF according to an embodiment, FIG. 5B is a diagram illustrating a mobile communication system including a TSCTSF that performs a function of the DetNet AF according to an embodiment, and FIG. 5C is a diagram illustrating a mobile communication system including a DetNet AF according to an embodiment.

According to embodiments, functions of the DetNet AF may be performed by the TSN AF or the TSCTSF in the core network of the 5G system.

Referring to FIG. 5A, when the TSN AF includes the function of the DetNet AF, an interface between the TSN AF and the DetNet controller may be similar to the interface between the TSN AF and the CNC. The interface between the TSN AF and the CNC may follow the IEEE interface standard, and the interface between the TSN AF and the DetNet controller may also follow YANG data modeling language. Depending on the case, the DetNet controller may be located within the CNC, and at this time, the TSN AF may use the TSN AF-CNC interface for communication with the DetNet controller.

In an embodiment, since the TSN AF is a function on the mobile communication system for combination with the TSN, an Ethernet PDU session may be supported within a 5G system and IEEE 802.1AS may be supported for the time synchronization. Therefore, in order for the TSN AF to further perform the DetNet AF function, the IP PDU session needs to be additionally supported, and the IEEE 1588 time synchronization function needs to be supported together.

Referring to FIG. 5B, the TSCTSF in the mobile communication system may support the IP PDU sessions as well as the Ethernet PDU sessions and may support time synchronization services by supporting up to IEEE 1588 together with IEEE 802.1AS. When the TSCTSF is connected to the DetNet controller and receives the DetNet traffic, the TSCTSF may need a function to map the DetNet traffic to the 5G QoS. The TSCTSF may accommodate the DetNet AF function more easily than the TSN AF, but a new external interface between the TSCTSF and the DetNet controller needs to be supported.

Referring to FIG. 5C, When the DetNet AF makes the mobile communication system function as a single DetNet node, the DetNet AF may support the IP PDU session and support the time synchronization service through some functions of the TSCTSF. Also, the DetNet AF may perform mapping between the DetNet traffic and the 5G QoS.

FIG. 6 is a diagram illustrating a mobile communication system and a DetNet system including a TSCTSF performing the function of the DetNet AF according to an embodiment.

Referring to FIG. 6, the TSCTSF may use a TSCTSF interface and/or an exposure interface of the mobile communication system to perform the function of the DetNet AF.

In an embodiment, an AF outside the core network requesting the TSC service may request the TSC service from the TSCTSF using an exposure interface via the NEF. When the DetNet controller is located in an external domain of the operator of the mobile communication system, the DetNet controller may interface using the exposure service through the NEF (Case 1).

On the other hand, a trusted AF (Trusted AF) located in the domain of the same operator as the mobile communication system may request a service through an interface with the TSCTSF directly without going through the NEF. Also, the DetNet controller located inside the domain of the operator of the mobile communication system may directly use the interface with the TSCTSF without going through NEF (Case 2).

In an embodiment, the TSCTSF may process various TSC services requested by an IP network environment except for the TSN connected in an Ethernet network environment. That is, even in case of DetNet operating in the IP network, the DetNet controller may request the TSC service for the DetNet traffic via the NEF or through a direct interface with the TSCTSF.

Table 1 below shows the YANG data model for the DetNet traffic.

TABLE 1

| Attributes | | Description | Comments |
|---|---|---|---|
| DnFlowSpecification | DetNet IP flow | SourceIpAddress DestinationIpAddress IPv6FlowLabel Dscp Protocol SourcePort DestinationPort IPSecSpi | RFC8939 |
| DnTrafficSpecification | | Interval MaxPacketsPerInterval MaxPayloadSize MinPayloadSize MinPacketsPerInterval | |
| | | DnEgressStatus | None: No Egress. Ready: All Egresses are ready. PartialFailed: One or more Egress is ready, and one or more Egress failed. The DetNet flow can be used if the Ingress is Ready. Failed: All Egresses failed. OutOfService: All Egresses are administratively blocked |
| | | FailureCode | a nonzero code that specifies the error |
| DnFlowRequirements | | MinBandwidth | octets per second |
| | | MaxLatency | integer number of nanoseconds |
| | | MaxLatencyVariation | integer number of nanoseconds |
| | | MaxLoss | Packet Loss Rate (PLR) |
| | | MaxConsecutiveLossTolerance | the maximum number of consecutive packets whose loss can be tolerated |
| | | MaxMisordering | the tolerable maximum number of packets that can be received out of order |

In FIG. 5B, the TSCTSF may be connected to the DetNet controller through a predetermined external interface. In the interface between the DetNet controller and the DetNet node, data may be transmitted by the Netconf protocol using the YANG data model and extension to the Restconf protocol is being considered.

In an embodiment, the TSCTSF may receive data of the YANG data model transmitted by DetNet controller using Netconf protocol and/or Restconf protocol as DetNet traffic information and map the DetNet flow to QoS information available in the 5G system based on the DetNet traffic information. Table 1 may represent the YANG data model of the DetNet traffic transmitted to TSCTSF by the DetNet controller.

Referring to FIG. 6, the DetNet controller may transmit the DetNet traffic using the 3GPP interface, and at this time, the 3GPP interface may be provided by the DetNet controller or the AF. The DetNet controller may transmit the DetNet traffic by using NEF interface (e.g., Nnef_AFsessionWithQoS service) or the TSCTSF (e.g., Ntsctsf_QoSandTSCAssistance). At this time, DetNet traffic input parameter needs to be added to the TSCTSF/NEF interface. The YANG data model in Table 1 may be included in newly added DetNet traffic parameters. The DetNet controller may change the YANG data model in Table 1 to a predetermined data exchange format (e.g., JavaScript Object Notation (JSON) format) using the Restconf protocol according to the service-based interface provided by the 3GPP system, and may transmit the DetNet traffic information to application functions (e.g., DetNet AF, TSN AF, or TSCTSF) in the mobile communication system or NEF of the mobile communication system.

Figure 7:
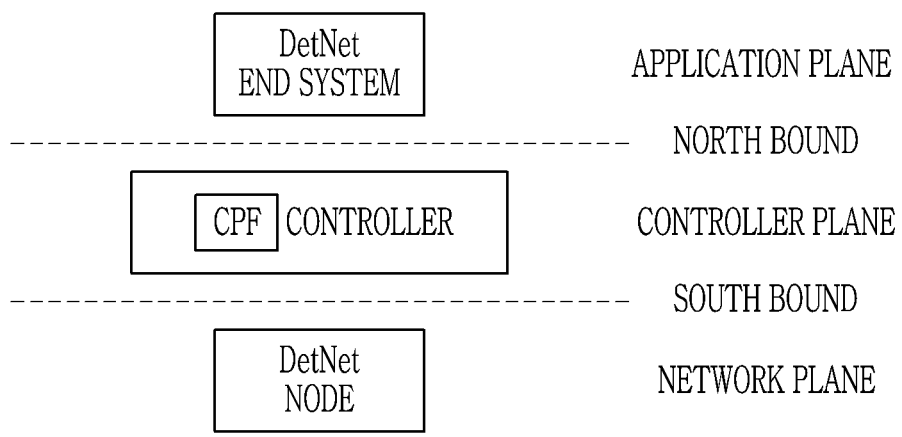
FIG. 7 is a diagram illustrating a DetNet information model according to an embodiment.

FIG. 7 is a diagram illustrating a DetNet information model according to an embodiment.

Referring to a DetNet information model in FIG. 7, the DetNet controller may use a DetNet node and a south bound interface (SBI). When the 5G system operates as the DetNet node, the DetNet controller may communicate with the 5G system using the same SBI. The DetNet controller may communicate with the UPF through the TSCTSF that performs the DetNet AF function of the 5G system through the SBI. communicate with the TSCTSF through the SBI, and the TSCTSF may control the UPF to operate as the DetNet node within the 5G system.

Figure 8:
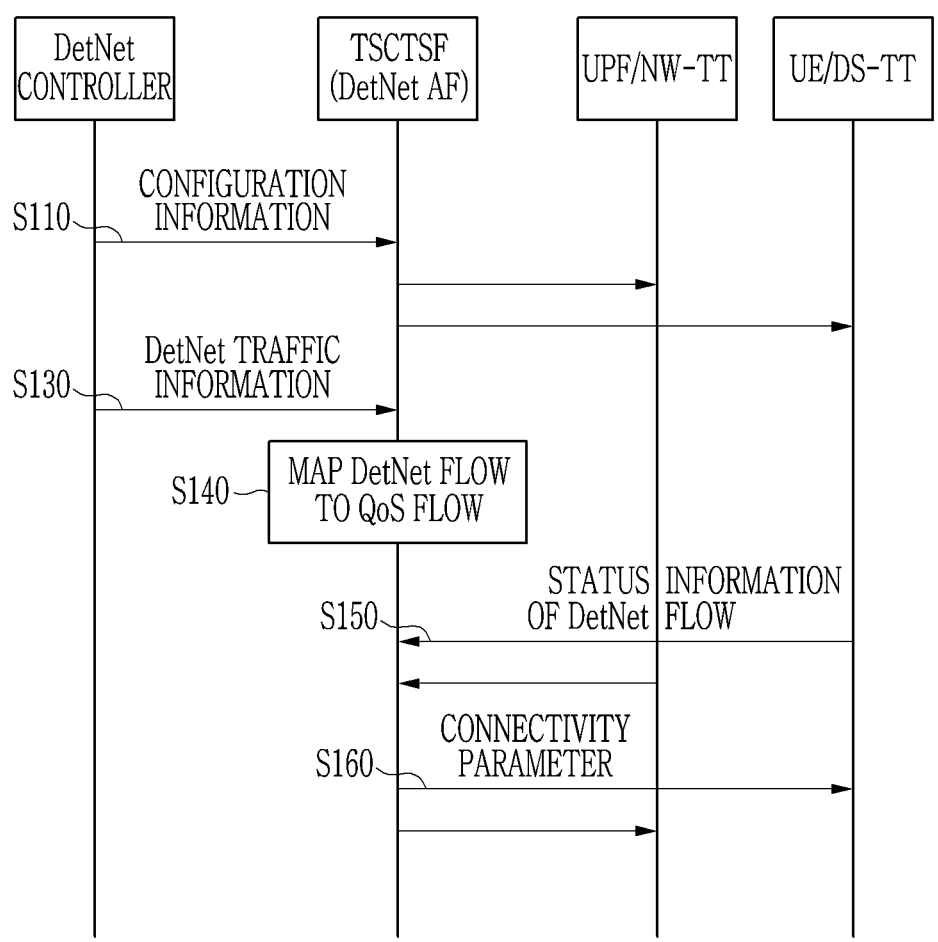
FIG. 8 is a flowchart illustrating a method in which the mobile communication system operates as a DetNet node according to an embodiment.

FIG. 8 is a flowchart illustrating a method in which the mobile communication system operates as a DetNet node according to an embodiment.

Referring to FIG. 8, the TSCTSF in charge of the DetNet AF function may receive configuration information to operate the mobile communication system as a single DetNet node from the DetNet controller of the DetNet system (S110).

To enable the mobile system to act as the DetNet node (e.g., a DetNet router) based on the configuration information received from the DetNet controller, the TSCTSF may configure the UPF/NW-TT and UE/DS-TT that process the DetNet traffic the DetNet node (S120).

Table 2 below shows properties used to manage information of user plane nodes in the 5G system. Referring to Table 2, a user plane node ID may be used as a bridge ID when a user plane node is connected to the TSN and operates as a TSN bridge. When the 5G system is connected to the DetNet system and operates as the DetNet node, the user plane node ID may be used as the DetNet Node ID.

TABLE 2

| Attribute | Description | Comment |
|---|---|---|
| DS-TT Port Number | Port Number allocated by the NW-TT for the DS-TT for a given PDU Session | |
| User plane node ID | Bridge identifier of the 5GS TSN bridge, or user-plane node ID, or DetNet node. | |

In an embodiment, the TSN AF may transmit configuration information to the DS-TT/NW-TT by adding the configuration information for the 5G system to operate as the TSN bridge to the PMIC/BMIC. The TSCTSF may transmit the configuration information to the DS-TT/NW-TT by adding the configuration information to the user plane node management information container (PMIC/UMIC) that enables the DS-TT/NW-TT processing the DetNet traffic to operate as the DetNet node.

Table 3 below shows standardized port management information (PMI) and Table 4 shows standardized user plane node management information (UMI).

TABLE 3

| | Applicability | | Supported operations by TSN AF | Supported operations by TSCTSF | Supported operations by TSCTSF (DetNet AF) |
|---|---|---|---|---|---|
| Port management information | DS-TT | NW-TT | | | |
| General | | | | | |
| Port management capabilities | X | X | R | R | R |
| Time Synchronization Information | | | | | |
| TSN Time domain number | X | X | RW | | |
| Supported PTP instance types | X | | R | R | R |
| Supported transport types | X | | R | R | R |
| Supported delay mechanisms | X | | R | R | R |
| PTP grandmaster capable | X | | R | R | R |
| gPTP grandmaster capable | X | | R | R | R |
| Supported PTP profiles | X | | R | R | R |
| Number of supported PTP instances | X | | R | R | R |
| PTP Instance ID | X | X | RW | RW | RW |
| > PTP profile | X | X | RW | RW | RW |
| > Transport type | X | X | RW | RW | RW |
| > Grandmaster candidate enabled | | X | RW | RW | RW |
| > Grandmaster enabled | X | | RW | RW | RW |

TABLE 3-continued

| Port management information | Applicability | | Supported operations by TSN AF | Supported operations by TSCTSF | Supported operations by TSCTSF (DetNet AF) |
|---|---|---|---|---|---|
| | DS-TT | NW-TT | | | |
| IEEE Std 1588 [126] data sets | | | | | |
| > defaultDS.clockIdentity | X | X | RW | RW | RW |
| > defaultDS.clockQuality.clockClass | X | X | RW | RW | RW |
| > defaultDS.clockQuality.clockAccuracy | X | X | RW | RW | RW |
| > defaultDS.clockQuality.offsetScaledLogVariance | X | X | RW | RW | RW |
| > defaultDS.priority1 | X | X | RW | RW | RW |
| > defaultDS.priority2 | X | X | RW | RW | RW |
| > defaultDS.domainNumber | X | X | RW | RW | RW |
| > defaultDS.sdoId | X | X | RW | RW | RW |
| > defaultDS.instanceEnable | X | X | RW | RW | RW |
| > defaultDS.externalPortConfigurationEnabled | | X | RW | RW | RW |
| > defaultDS.instanceType | X | X | RW | RW | RW |
| > portDS.portIdentity | X | X | RW | RW | RW |
| > portDS.portState | X | X | RW | RW | RW |
| > portDS.logMinDelayReqInterval | X | X | RW | RW | RW |
| > portDS.logAnnounceInterval | X | X | RW | RW | RW |
| > portDS.announceReceiptTimeout | | X | RW | RW | RW |
| > portDS.logSyncInterval | X | X | RW | RW | RW |
| > portDS.delayMechanism | X | X | RW | RW | RW |
| > portDS.logMinPdelayReqInterval | X | X | RW | RW | RW |
| > portDS.versionNumber | X | X | RW | RW | RW |
| > portDS.minorVersionNumber | X | X | RW | RW | RW |
| > portDS.delayAssymetry | X | X | RW | RW | RW |
| > portDS.portEnable | X | X | RW | RW | RW |
| > timePropertiesDS.currentUtcOffset | X | X | RW | RW | RW |
| > timePropertiesDS.timeSource | X | X | RW | RW | RW |
| > externalPortConfigurationPortDS.desiredState | | X | RW | RW | RW |
| IEEE Std 802.1 AS [104] data sets | | | | RW | RW |
| > defaultDS.clockIdentity | X | X | RW | RW | RW |
| > defaultDS.clockQuality.clockClass | X | X | RW | RW | RW |
| > defaultDS.clockQuality.clockAccuracy | X | X | RW | RW | RW |
| > defaultDS.clockQuality.offsetScaledLogVariance | X | X | RW | RW | RW |
| > defaultDS.priority1 | X | X | RW | RW | RW |
| > defaultDS.priority2 | X | X | RW | RW | RW |
| > defaultDS.timeSource | X | X | RW | RW | RW |
| > defaultDS.domainNumber | X | X | RW | RW | RW |
| > defaultDS.sdoId | X | X | RW | RW | RW |
| > defaultDS.externalPortConfigurationEnabled | | X | RW | RW | RW |
| > defaultDS.instanceEnable | X | X | RW | RW | RW |
| > portDS.portIdentity | X | X | RW | RW | RW |
| > portDS.portState | | X | R | R | R |
| > portDS.ptpPortEnabled | X | X | RW | RW | RW |
| > portDS.delayMechanism | X | X | RW | RW | RW |
| > portDS.isMeasuringDelay | X | X | R | R | R |
| > portDS.asCapable | X | X | R | R | R |
| > portDS.meanLinkDelay | X | X | R | R | R |
| > portDS.meanLinkDelayThresh | X | X | RW | RW | RW |
| > portDS.delayAssymetry | X | X | RW | RW | RW |
| > portDS.neighborRateRatio | X | X | R | R | R |
| > portDS.initialLogAnnounceInterval | X | X | RW | RW | RW |
| > portDS.currentLogAnnounceInterval | X | X | R | R | R |
| > portDS.useMgtSettableLogAnnounceInterval | X | X | RW | RW | RW |
| > portDS.mgtSettableLogAnnounceInterval | X | X | RW | RW | RW |
| > portDS.announceReceiptTimeout | | X | RW | RW | RW |
| > portDS.initialLogSyncInterval | X | X | RW | RW | RW |
| > portDS.currentLogSyncInterval | X | X | R | R | R |
| > portDS.useMgtSettableLogSyncInterval | X | X | RW | RW | RW |
| > portDS.mgtSettableLogSyncInterval | X | X | RW | RW | RW |
| > portDS.syncReceiptTimeout | | X | RW | RW | RW |
| > portDS.syncReceiptTimeoutTimeInterval | | X | RW | RW | RW |
| > portDS.initialLogPdelayReqInterval | X | X | RW | RW | RW |
| > portDS.currentLogPdelayReqInterval | X | X | R | R | R |
| > portDS.useMgtSettableLogPdelayReqInterval | X | X | RW | RW | RW |
| > portDS.mgtSettableLogPdelayReqInterval | X | X | RW | RW | RW |
| > portDS.initialLogGptpCapableMessageInterval | X | X | RW | RW | RW |
| > portDS.currentLogGptpCapableMessageInterval | X | X | R | R | R |
| > portDS.useMgtSettableLogGptpCapableMessageInterval | X | X | RW | RW | RW |
| > portDS.mgtSettableLogGptpCapableMessageInterval | X | X | RW | RW | RW |
| > portDS.initialComputeNeighborRateRatio | X | X | RW | RW | RW |
| > portDS.currentComputeNeighborRateRatio | X | X | R | R | R |
| > portDS.useMgtSettableComputeNeighborRateRatio | X | X | RW | RW | RW |
| > portDS.mgtSettableComputeNeighborRateRatio | X | X | RW | RW | RW |

TABLE 3-continued

| Port management information | Applicability DS-TT | Applicability NW-TT | Supported operations by TSN AF | Supported operations by TSCTSF | Supported operations by TSCTSF (DetNet AF) |
|---|---|---|---|---|---|
| > portDS.initialComputeMeanLinkDelay | X | X | RW | RW | RW |
| > portDS.currentComputeMeanLinkDelay | X | X | R | R | R |
| > portDS.useMgtSettableComputeMeanLinkDelay | X | X | RW | RW | RW |
| > portDS.mgtSettableComputeMeanLinkDelay | X | X | RW | RW | RW |
| > portDS.allowedLostResponses | X | X | RW | RW | RW |
| > portDS.allowedFaults | X | X | RW | RW | RW |
| > portDS.gPtpCapableReceiptTimeout | X | X | RW | RW | RW |
| > portDS.versionNumber | X | X | RW | RW | RW |
| > portDS.nup | X | X | RW | RW | RW |
| > portDS.ndown | X | X | RW | RW | RW |
| > portDS.oneStepTxOper | X | X | R | R | R |
| > portDS.oneStepReceive | X | X | R | R | R |
| > portDS.oneStepTransmit | X | X | R | R | R |
| > portDS.initialOneStepTxOper | X | X | RW | RW | RW |
| > portDS.currentOneStepTxOper | X | X | RW | RW | RW |
| > portDS.useMgtSettableOneStepTxOper | X | X | RW | RW | RW |
| > portDS.mgtSettableOneStepTxOper | X | X | RW | RW | RW |
| > portDS.syncLocked | X | X | R | R | R |
| > portDS.pdelayTruncatedTimestampsArray | X | X | RW | RW | RW |
| > portDS.minorVersionNumber | X | X | RW | RW | RW |
| > timePropertiesDS.currentUtcOffset | X | X | RW | RW | RW |
| > externalPortConfigurationPortDS.desiredState |  | R | RW | RW | RW |

TABLE 4

| User plane node management information | Supported operations by TSN AF | Supported operations by TSCTSF | Supported operations by TSCTSF (DetNet AF) |
|---|---|---|---|
| Information for 5GS Bridge |  |  |  |
| User plane node Address | R | R | R |
| User plane node ID | R | R | R |
| NW-TT port numbers | R | R | R |
| Time synchronization information |  |  |  |
| Supported PTP instance types | R | R | R |
| Supported transport types | R | R | R |
| Supported delay mechanisms | R | R | R |
| PTP grandmaster capable | R | R | R |
| gPTP grandmaster capable | R | R | R |
| Supported PTP profiles | R | R | R |
| Number of supported PTP instances | R | R | R |
| Time synchronization information for DS-TT ports |  |  |  |
| > Time synchronization information for each DS-TT port |  |  |  |
| > DS-TT port number | RW | RW | RW |
| >> Time synchronization information for each PTP Instance |  |  |  |
| >> PTP Instance ID | RW | RW | RW |
| >> PTP profile | RW | RW | RW |
| >> Transport type | RW | RW | RW |
| >> Grandmaster on behalf of DS-TT enabled | RW | RW | RW |
| IEEE Std 1588 [126] data sets |  |  |  |
| >> defaultDS.clockIdentity | RW | RW | RW |
| >> defaultDS.clockQuality.clockClass | RW | RW | RW |
| >> defaultDS.clockQuality.clockAccuracy | RW | RW | RW |
| >> defaultDS.clockQuality.offsetScaledLogVariance | RW | RW | RW |
| >> defaultDS.priority1 | RW | RW | RW |
| >> defaultDS.priority2 | RW | RW | RW |
| >> defaultDS.domainNumber | RW | RW | RW |
| >> defaultDS.sdoId | RW | RW | RW |
| >> defaultDS.instanceEnable | RW | RW | RW |
| >> defaultDS. externalPortConfigurationEnabled | RW | RW | RW |
| >> defaultDS.instanceType | RW | RW | RW |
| >> portDS.portIdentity | RW | RW | RW |
| >> portDS.portState | R | R | R |
| >> portDS.logMinDelayReqInterval | RW | RW | RW |
| >> portDS.logAnnounceInterval | RW | RW | RW |

TABLE 4-continued

| User plane node management information | Supported operations by TSN AF | Supported operations by TSCTSF | Supported operations by TSCTSF (DetNet AF) |
|---|---|---|---|
| >> portDS.announceReceiptTimeout | RW | RW | RW |
| >> portDS.logSyncInterval | RW | RW | RW |
| >> portDS.delayMechanism | RW | RW | RW |
| >> portDS.logMinPdelayReqInterval | RW | RW | RW |
| >> portDS.versionNumber | RW | RW | RW |
| >> portDS.minorVersionNumber | RW | RW | RW |
| >> portDS.delayAssymetry | RW | RW | RW |
| >> portDS.portEnable | RW | RW | RW |
| >> timePropertiesDS.currentUtcOffset | RW | RW | RW |
| >> timePropertiesDS.timeSource | RW | RW | RW |
| >> externalPortConfigurationPortDS.desiredState | RW | RW | RW |
| IEEE Std 802.1AS [104] data sets | | | |
| >> defaultDS.clockIdentity | RW | RW | RW |
| >> defaultDS.clockQuality.clockClass | RW | RW | RW |
| >> defaultDS.clockQuality.clockAccuracy | RW | RW | RW |
| >> defaultDS.clockQuality.offsetScaledLogVariance | RW | RW | RW |
| >> defaultDS.priority1 | RW | RW | RW |
| >> defaultDS.priority2 | RW | RW | RW |
| >> defaultDS.timeSource | RW | RW | RW |
| >> defaultDS.domainNumber | RW | RW | RW |
| >> defaultDS.externalPortConfigurationEnabled | RW | RW | RW |
| >> defaultDS.sdoId | RW | RW | RW |
| >> defaultDS.instanceEnable | RW | RW | RW |
| >> portDS.portIdentity | RW | RW | RW |
| >> portDS.portState | R | R | R |
| >> portDS.ptpPortEnabled | RW | RW | RW |
| >> portDS.delayMechanism | RW | RW | RW |
| >> portDS.isMeasuringDelay | R | R | R |
| >> portDS.asCapable | R | R | R |
| >> portDS.meanLinkDelay | R | R | R |
| >> portDS.meanLinkDelayThresh | RW | RW | RW |
| >> portDS.delayAssymetry | RW | RW | RW |
| >> portDS.neighborRateRatio | R | R | R |
| >> portDS.initialLogAnnounceInterval | RW | RW | RW |
| >> portDS.currentLogAnnounceInterval | R | R | R |
| >> portDS.useMgtSettableLogAnnounceInterval | RW | RW | RW |
| >> portDS.mgtSettableLogAnnounceInterval | RW | RW | RW |
| >> portDS.announceReceiptTimeout | RW | RW | RW |
| >> portDS.initialLogSyncInterval | RW | RW | RW |
| >> portDS.currentLogSyncInterval | R | R | R |
| >> portDS.useMgtSettableLogSyncInterval | RW | RW | RW |
| >> portDS.mgtSettableLogSyncInterval | RW | RW | RW |
| >> portDS.syncReceiptTimeout | RW | RW | RW |
| >> portDS.syncReceiptTimeoutTimeInterval | RW | RW | RW |
| >> portDS.initialLogPdelayReqInterval | RW | RW | RW |
| >> portDS.currentLogPdelayReqInterval | R | R | R |
| >> portDS.useMgtSettableLogPdelayReqInterval | RW | RW | RW |
| >> portDS.mgtSettableLogPdelayReqInterval | RW | RW | RW |
| >> portDS.initialLogGptpCapableMessageInterval | RW | RW | RW |
| >> portDS.currentLogGptpCapableMessageInterval | R | R | R |
| >> portDS.useMgtSettableLogGptpCapableMessageInterval | RW | RW | RW |
| >> portDS.mgtSettableLogGptpCapableMessageInterval | RW | RW | RW |
| >> portDS.initialComputeNeighborRateRatio | RW | RW | RW |
| >> portDS.currentComputeNeighborRateRatio | R | R | R |
| >> portDS.useMgtSettableComputeNeighborRateRatio | RW | RW | RW |
| >> portDS.mgtSettableComputeNeighborRateRatio | RW | RW | RW |
| >> portDS.initialComputeMeanLinkDelay | RW | RW | RW |
| >> portDS.currentComputeMeanLinkDelay | R | R | R |
| >> portDS.useMgtSettableComputeMeanLinkDelay | RW | RW | RW |
| >> portDS.mgtSettableComputeMeanLinkDelay | RW | RW | RW |
| >> portDS.allowedLostResponses | RW | RW | RW |
| >> portDS.allowedFaults | RW | RW | RW |
| >> portDS.gPtpCapableReceiptTimeout | RW | RW | RW |
| >> portDS.versionNumber | RW | RW | RW |
| >> portDS.nup | RW | RW | RW |
| >> portDS.ndown | RW | RW | RW |
| >> portDS.oneStepTxOper | R | R | R |
| >> portDS.oneStepReceive | R | R | R |
| >> portDS.oneStepTransmit | R | R | R |
| >> portDS.initialOneStepTxOper | RW | RW | RW |
| >> portDS.currentOneStepTxOper | RW | RW | RW |
| >> portDS.useMgtSettableOneStepTxOper | RW | RW | RW |
| >> portDS.mgtSettableOneStepTxOper | RW | RW | RW |
| >> portDS.syncLocked | R | R | R |

TABLE 4-continued

| User plane node management information | Supported operations by TSN AF | Supported operations by TSCTSF | Supported operations by TSCTSF (DetNet AF) |
|---|---|---|---|
| >> portDS.pdelayTruncatedTimestampsArray | RW | RW | RW |
| >> portDS.minorVersionNumber | RW | RW | RW |
| >> timePropertiesDS.currentUtcOffset | RW | RW | RW |
| >> externalPortConfigurationPortDS.desiredState | RW | RW | RW |

Table 3 shows information that may be expanded in relation to the DetNet AF in the standardized PMI and Table 4 shows information that may be expanded in relation to the DetNet AF in the standardized UMI.

Since the 5G system operating as the DetNet node may reuse the existing TSC service or time synchronization function, functions not related to the DetNet AF, such as IEEE standard function related to TSN bridge information operating in the Ethernet in the PMI/UMI table, may not be marked.

As a time synchronization function supported to operate as the DetNet node, IEEE 802.1AS, IEEE 1588 BC (Boundary Clock), IEEE 1588 peer-to-peer TC (Transparent Clock), IEEE 1588 end-to-end TC functions that can be supported by the 5G system function may be used. The DS-TT and the NW-TT may process time synchronization message.

Referring to FIG. 8, the TSCTSF may receive the DetNet traffic information from the DetNet controller (S130) and map the DetNet flow to the QoS information of the mobile communication system based on the DetNet traffic information (S140).

The YANG data model may be used for the DetNet configuration and the YANG data model may be a centralized configuration model like the CNC. The DetNet configuration may be classified into topology, path configuration, flow configuration, and status. The flow configuration may include {flow identification, priority, traffic specification, encapsulation method}.

The DetNet flow input from the DetNet controller may be added/modified/deleted in the 5G system. In an embodiment, for a DetNet IP flow, the encapsulation method of the flow configuration may have an IP value and the priority of the flow configuration may be treated as the same value as the priority value used in the TSN. The specific attributes that the DetNet flow may have, including flow identification and traffic specification of the flow configuration, are shown in Table 5 below.

TABLE 5

| Attributes | Description | | Comments |
|---|---|---|---|
| DnFlowID | A unique (management) identifier is needed for each DetNet flow within the DetNet domain | | |
| DnPayloadType | encapsulated App-flow format | | Ethernet, MPLS, or IP |
| DnFlowFormat | | | MPLS or IP |
| DnFlowSpecification | DetNet IP flow | SourceIpAddress DestinationIpAddress IPv6FlowLabel Dscp Protocol SourcePort DestinationPort IPSecSpi | RFC8939 |
| DnTrafficSpecification | | Interval MaxPacketsPerInterval MaxPayloadSize MinPayloadSize MinPacketsPerInterval | |
| DnFlowEndpoints | the start and end reference points of the DetNet flow by pointing to the ingress interface/node and egress interface(s)/node(s) | | |
| DnFlowRank | the rank of this flow relative to other flows in the DetNet domain | | range: 0-255 |
| DnFlowStatus | DnIngressStatus | | None: No Ingress. Ready: Ingress is ready. Failed: Ingress failed. OutOfService: Administratively blocked |
| | DnEgressStatus | | None: No Egress. Ready: All Egresses are ready. PartialFailed: One or more Egress is ready, and one or more Egress failed. The DetNet flow can be used if the Ingress is Ready. Failed: All Egresses failed. |

TABLE 5-continued

| Attributes | Description | Comments |
|---|---|---|
| | FailureCode | OutOfService: All Egresses are administratively blocked a nonzero code that specifies the error |
| DnFlowRequirements | MinBandwidth | octets per second |
| | MaxLatency | integer number of nanoseconds |
| | MaxLatencyVariation | integer number of nanoseconds |
| | MaxLoss | Packet Loss Rate (PLR) |
| | MaxConsecutiveLossTolerance | the maximum number of consecutive packets whose loss can be tolerated |
| | MaxMisordering | the tolerable maximum number of packets that can be received out of order |
| DnFlowBiDir | the flow and the corresponding reverse direction flow must share the same path | |

Table 6 below shows the extended PMI to support the DetNet flow in the 5G system.

TABLE 6

| Port management information | Applicability (see NOTE 6) | | Supported operations by TSN AF | Supported operations by TSCTSF |
|---|---|---|---|---|
| | DS-TT | NW-TT | | |
| DetNet flow general | | | | |
| FlowID | X | X | — | RW |
| PayloadType (IP) | X | X | — | RW |
| FlowFormat (IP) | X | X | — | RW |
| Flow Specification (DetNet IP flow) | | | | |
| SourceIpAddress | X | X | — | RW |
| DestinationIpAddress | X | X | — | RW |
| IPv6FlowLabel | X | X | — | RW |
| Dscp | X | X | — | RW |
| Protocol | X | X | — | RW |
| SourcePort | X | X | — | RW |
| DestinationPort | X | X | — | RW |
| IPSecSpi | X | X | — | RW |
| Flow Status | | | | |
| IngressStatus | X | X | — | R |
| EgressStatus | X | X | — | R |
| FailureCode | X | X | — | R |

Each port of the TSN AF, the TSCTSF (DetNet AF), and the DS-TT/NW-TT may have attributes {flow ID, flow specification} to identify the DetNet flows. In addition, each port may also have a flow status attribute in order to report the flow status.

Referring to FIG. 8, the DS-TT/NW-TT may report status information of DetNet flow to the DetNet AF when status report is configured (S150). For example, when the status report is configured, the DS-TT may report the status information of the DetNet flow to the TSCTSF (DetNet AF) through non-access stratum (NAS) signaling. The NW-TT may report the flow status to the DetNet AF via the SMF through the UPF when the status report is configured. If the N4 interface between the UPF and the SMF is a service-based interface, the UPF may directly transmit the flow status information to the TSCTSF (DetNet AF).

FIG. 9 is a diagram illustrating information of a DetNet flow identified in a port of a mobile communication system according to an embodiment.

Referring to FIG. 9, flow information identified in the port of the DS-TT/NW-TT may have flow requirements (or traffic-requirement) and traffic specification. That is, the QoS required by the DetNet flow may be mapped to the QoS flow of the 5G system by the TSCTSF (DetNet AF). At this time, at least one DetNet flow may be mapped to one 5G QoS flow.

In order to support 'max-latency-variation' among the properties of the DetNet flow, a jitter value related to the property may be previously determined in the mobile communication system. When the jitter value is not defined in the 5G system, the jitter value may be determined in advance through a QoS flow or the TSCAI or as an independent value. As various high-reliability and low-latency services are required, jitter information needs to be established in the mobile communication system.

Among the properties of the DetNet flow, 'max-consecutive-loss-tolerance' is a characteristic that only the DetNet flow has, and the corresponding parameter may be additionally established in the mobile communication system through the QoS flow or the TSCAI or by an additional option for the DetNet.

In order to check the connectivity of the DetNet flow, the following three functions may be required.

1. BFD (Bidirectional Forwarding Detection) and STAMP (Simple Two-Way Active Measurement Protocol) using well-known UDP port
2. Ping, Traceroute using Internet control message protocol (ICMP)
3. Generic Routing Encapsulation (GRE)-in-UDP (Protocol Type in GRE header=0x8902)

In an embodiment, the mobile communication system may optionally provide a DetNet flow management function. Among the functions for checking the connectivity of the DetNet flow, the function using the ICMP may operate in IP packet processing of the 5G system. However, since entities of the conventional mobile communication system does not provide functions 1 and 3, the DS-TT and/or NW-TT needs to provide the functions 1 and 3.

Referring to FIG. 8, the TSCTSF (DetNet AF) may transmit parameters for managing the connectivity of the DetNet flows to the DS-TT and/or NW-TT (S160). The DS-TT and/or NW-TT may then manage the connectivity of the DetNet flows based on the parameters for managing the connectivity of the DetNet flows.

Table 7 below shows PMI parameters for the DS-TT and/or NW-TT to perform the DetNet flow management and Table 8 shows UMI parameters for the DS-TT and/or NW-TT to perform the DetNet flow management.

As described above, embodiments propose a mobile communication system structure that can act as a DetNet node, enabling the mobile communication system to integrate with DetNet to provide the time synchronization communication and time synchronization services required by a wide variety of applications.

Figure 10:
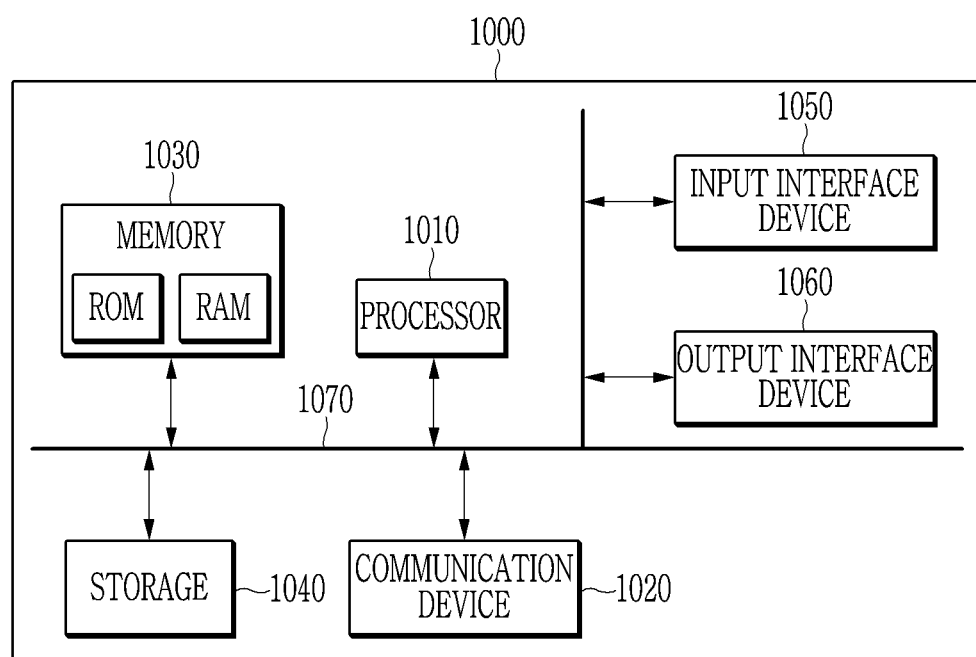
FIG. 10 is a diagram illustrating an application function according to an embodiment.

FIG. 10 is a diagram illustrating an application function according to an embodiment.

The application function according to an embodiment may be implemented as a computer system, for example, a computer-readable medium. Referring to FIG. 10, the computer system 1000 may include at least one of a processor 1010, a memory 1030, an input interface device 1050, an output interface device 1060, and a storage device 1040 communicating through a bus 1070. The computer system 1000 may also include a communication device 1020 coupled to the network. The processor 1010 may be a central processing unit (CPU) or a semiconductor device that executes instructions stored in the memory 1030 or the storage device 1040. The memory 1030 and the storage device 1040 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

TABLE 7

| Port management information | Applicability | | Supported operations by TSN AF | Supported operations by TSCTSF | Supported operations by DetNet AF | Reference |
| --- | --- | --- | --- | --- | --- | --- |
| | DS-TT | NW-TT | | | | |
| BFD(Bidirectional Forwarding Detection) | X | X | — | — | RW | RFC5880 |
| STAMP(Simple Two-Way Active Measurement Protocol) | X | X | — | — | RW | RFC8762 |
| GRE-in-UDP (Protocol Type in GRE header = 0x8902) | X | X | — | — | RW | RFC8086 |

TABLE 8

| User plane node management information | Supported operations by TSN AF | Supported operations by TSCTSF | Supported operations by DetNet AF | Reference |
| --- | --- | --- | --- | --- |
| BFD(Bidirectional Forwarding Detection) | — | — | RW | RFC5880 |
| STAMP(Simple Two-Way Active Measurement Protocol) | — | — | RW | RFC8762 |
| GRE-in-UDP (Protocol Type in GRE header = 0x8902) | — | — | RW | RFC8086 |

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 1020 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any disclosure or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. An application function comprising:
   a processor and a memory,
   wherein the processor executes a program stored in the memory to perform:
   receiving configuration information for configuring a Deterministic Networking (DetNet) node from a DetNet controller in a DetNet system; and
   configuring a user plane function (UPF), a device side time sensitive networking translator (DS-TT), and/or a network side time sensitive networking (NW-TT) in a mobile communication system as the DetNet node.

2. The application function of claim 1, wherein when configuring a UPF, a DS-TT, and/or a NW-TT in a mobile communication system as the DetNet node,
   the processor performs adding the configuration information to at least one information container and transferring the at least one information container to the DS-TT and/or the NW-TT.

3. The application function of claim 1, wherein the application function is a DetNet application function (AF) configured to communicate the mobile communication system with the DetNet controller of the DetNet system.

4. The application function of claim 1, wherein the application function is a time sensitive communication time synchronization function (TSCTSF) in the mobile communication system.

5. The application function of claim 1, wherein the application function is a time sensitive networking (TSN) application function (AF) in the mobile communication system.

6. The application function of claim 1, wherein when receiving configuration information for configuring a DetNet node from a DetNet controller in a DetNet system,
   the processor performs receiving the configuration information from the DetNet controller located in an external domain of the mobile communication system via a network exposure function (NEF) in the mobile communication system.

7. The application function of claim 1, wherein when receiving configuration information for configuring a DetNet node from the DetNet controller in a DetNet system,
   the processor performs receiving the configuration information from the DetNet controller located within a domain of an operator of the mobile communication system.

8. The application function of claim 1, wherein the processor executes the program to further perform:
   receiving DetNet traffic information from the DetNet controller; and
   mapping a DetNet flow to a quality of service (QoS) flow of the mobile communication system based on the DetNet traffic information.

9. The application function of claim 1, wherein the processor executes the program to further perform sending a parameter for managing connectivity of the DetNet flow to the DS-TT and/or the NW-TT.

10. A method for processing a Deterministic Networking (DetNet) traffic, the method comprising:
    receiving, by an application function, configuration information for configuring a DetNet node from a DetNet controller in a DetNet system; and
    configuring, by the application function, a user plane function (user plane function, UPF), a device side time sensitive networking translator (DS-TT), and/or a network side time sensitive networking translator (NW-TT) in a mobile communication system as the DetNet node.

11. The method of claim 10, wherein the configuring a UPF, a DS-TT, and/or a NW-TT in a mobile communication system as the DetNet node comprises
    adding the configuration information to at least one information container and transferring the at least one information container to the DS-TT and/or the NW-TT.

12. The method of claim 10, wherein the application function is a time sensitive communication time synchronization function (TSCTSF) in the mobile communication system.

13. The method of claim 10, wherein the receiving configuration information for configuring a DetNet node from a DetNet controller of a DetNet system comprises:
    receiving, by the application function, the configuration information from the DetNet controller located in an external domain of the mobile communication system via a network exposure function (NEF) within the mobile communication system; or
    receiving, by the application function, the configuration information from the DetNet controller located in a domain of an operator of the mobile communication system.

14. The method of claim 10 further comprising:
    receiving DetNet traffic information from the DetNet controller; and
    mapping a DetNet flow to a quality of service (QoS) flow of the mobile communication system based on the DetNet traffic information.

15. The method of claim 10 further comprising transferring a parameter for managing connectivity of a DetNet flow to the DS-TT and/or the NW-TT.

* * * * *